United States Patent
Bittner et al.

(10) Patent No.: US 10,994,290 B2
(45) Date of Patent: May 4, 2021

(54) SPRAY SYSTEM WITH RAIL MOUNTING FOR AN AGRICULTURAL MACHINE

(71) Applicant: CNH Industrial America LLC, New Holland, PA (US)

(72) Inventors: Roy A. Bittner, Cato, WI (US); Steven Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 29 days.

(21) Appl. No.: 16/359,434

(22) Filed: Mar. 20, 2019

(65) Prior Publication Data

US 2020/0298257 A1    Sep. 24, 2020

(51) Int. Cl.
  *B05B 3/18*    (2006.01)
  *A01G 25/09*   (2006.01)

(52) U.S. Cl.
  CPC ............... *B05B 3/18* (2013.01); *A01G 25/09* (2013.01)

(58) Field of Classification Search
  CPC .......... B05B 3/18; A01G 25/09; A01G 25/097
  USPC ..... 239/173; 285/63, 124.1; 138/30, 92, 116
  See application file for complete search history.

(56) References Cited

U.S. PATENT DOCUMENTS

| | | | |
|---|---|---|---|
| 4,058,260 A | 11/1977 | Lestradet | |
| 4,553,702 A | 11/1985 | Coffee et al. | |
| 5,862,987 A | 1/1999 | Reif | |
| 6,053,427 A | 4/2000 | Wilger et al. | |
| 6,269,757 B1 * | 8/2001 | Kiest | A01C 23/024 111/119 |
| 6,837,446 B1 | 1/2005 | Jesse | |
| 7,066,402 B2 | 6/2006 | Goebel et al. | |
| 8,985,532 B2 | 3/2015 | Chirpich et al. | |
| 9,114,859 B2 * | 8/2015 | Biaggi | B67D 9/00 |
| 10,589,139 B2 * | 3/2020 | Ringer | F16K 37/005 |
| 2008/0179429 A1 | 7/2008 | Beilke et al. | |
| 2012/0132730 A1 | 5/2012 | Peterson et al. | |
| 2014/0259897 A1 | 9/2014 | Godbole et al. | |

FOREIGN PATENT DOCUMENTS

| | | |
|---|---|---|
| CN | 105597975 | 11/2017 |
| DE | 2020070090122 | 1/2008 |
| WO | 2012087859 | 6/2012 |
| WO | 2012088014 | 6/2012 |

\* cited by examiner

*Primary Examiner* — Viet Le
*Assistant Examiner* — Steven M Cernoch
(74) *Attorney, Agent, or Firm* — Rebecca L. Henkel; Rickard K. DeMille

(57) ABSTRACT

The present invention is directed to a spray system for an agricultural machine in which multiple spray nozzles for spraying a liquid product can be dynamically arranged in number and location along a preconfigured rail acting as a boom. Each spray nozzle can include an attachment arrangement for conveniently attaching, tightening, loosening and/or detaching the spray nozzle with respect to the rail. In one aspect, the attachment arrangement can comprise a fastener configured to tighten or loosen a clip with respect to a body for engaging the rail. A separate product line for supplying liquid product to the spray nozzles can flexibly include numerous ports, more than there are spray nozzles, with some ports attaching to spray nozzles via branch lines, and other ports being sealed to inhibit flow.

14 Claims, 5 Drawing Sheets

SPRAY SYSTEM WITH RAIL MOUNTING FOR AN AGRICULTURAL MACHINE

FIELD OF THE INVENTION

The invention relates generally to agricultural machines, such as self-propelled sprayers and, in particular, to a spray system for an agricultural machine having a nozzle assembly for spraying a liquid product and an attachment arrangement coupled to the nozzle assembly, the attachment arrangement and the nozzle assembly together forming a nozzle system, in which the nozzle system is moveable along a rail through multiple positions upon unlocking and securely mountable to a given position upon locking.

BACKGROUND OF THE INVENTION

Agricultural machines, such as self-propelled sprayers, are getting larger to increase operating efficiency, such as by covering more area in a single pass of a spraying session. Spray nozzles in such systems are typically mounted with holes that are drilled at specific spacings in a supply pipe or tube with nozzle bodies being clamped to such locations. However, this arrangement can be restrictive in several ways. For example, the boom design may be restricted to providing space for only the particular relationship of nozzle and feed line. Manufacturers must maintain inventor of drilled pipes for every spacing on every section of every boom length offered. Dealers ordering stock units must guess what spacing a future buyer might desire or risk the cost of parts and labor for a conversion. Operators and resellers may be restricted to only that spacing unless the feed line is replaced. Flow may be restricted by the diameter of the drilled hole. Moreover, on occasions when a user may wish to spray two products at once, room must be found for a complete second feed line with nozzles. A need therefore exists for an improved spray system that eliminates one or more of the foregoing disadvantages.

SUMMARY OF THE INVENTION

The present invention is directed to a spray system for an agricultural machine in which multiple spray nozzles for spraying a liquid product can be dynamically arranged in number and location along a preconfigured rail acting as a boom. Each spray nozzle can include an attachment arrangement for conveniently attaching, tightening, loosening and/or detaching the spray nozzle with respect to the rail. In one aspect, the attachment arrangement can comprise a fastener configured to tighten or loosen a clip with respect to a body for engaging the rail. A separate product line for supplying liquid product to the spray nozzles can flexibly include numerous ports, more than there are spray nozzles, with some ports attaching to spray nozzles via branch lines, and other ports being sealed to inhibit flow.

Accordingly, in one aspect, a rail type mounting system can be configured for nozzle bodies on agricultural sprayers which allow multiple combinations of spacings and product flow. A feed line with enough ports to accommodate a maximum number of nozzles can be fitted to a sprayer boom independent of nozzle location. A railing can also be fitted for the attachment of the nozzles. Clip on nozzles can attach to the railing at any spacing desired. Branch hoses can connect the feed line to each nozzle.

Many issues can be resolved by mounting the nozzles on the rail independent of the feed lin. The feed line can be remotely mounted. Bodies can be added and/or subtracted at any time. Manufacturers can ship machines with a limited number of nozzle spacings, such as one, and end users can custom tailor spacings to suit their particular needs. The clip can be made to break away if the nozzle is impacted. This part is easily replaced and affordable. The branch hose can act as a lanyard to retain the nozzle body if broken off. This can work well with nozzle body flushing systems, flow meters and flow switches. Markings on the rail can identify standard nozzle spacings. Also, the rail could be integral to a boom structure. Push to connect fittings and stackable nozzle bodies can be used. Different shaped rails, or finite spacings could be established.

Specifically, then, one aspect of the invention can include a spray system for an agricultural machine, including: a nozzle assembly for spraying a liquid product; and an attachment arrangement coupled to the nozzle assembly, the attachment arrangement and the nozzle assembly together forming a nozzle system, in which the nozzle system is configured to move along a rail through multiple positions upon unlocking the attachment arrangement with respect to the rail, and in which the nozzle system is configured to securely mount to a given position of the multiple positions for spraying a liquid product upon locking the attachment arrangement with respect to the rail.

Another aspect of the invention can include: a self-propelled agricultural vehicle, including: a chassis supporting a cab and having multiple wheels for moving the vehicle; a liquid product application system supported by the chassis, the liquid product application system including a rail and multiple nozzle systems, each nozzle system including: a nozzle assembly for spraying a liquid product; and an attachment arrangement coupled to the nozzle assembly, in which each nozzle system is configured to move along the rail through multiple positions upon unlocking the attachment arrangement with respect to the rail, and in which each nozzle system is configured to securely mount to a given position of the multiple positions for spraying a liquid product upon locking the attachment arrangement with respect to the rail.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
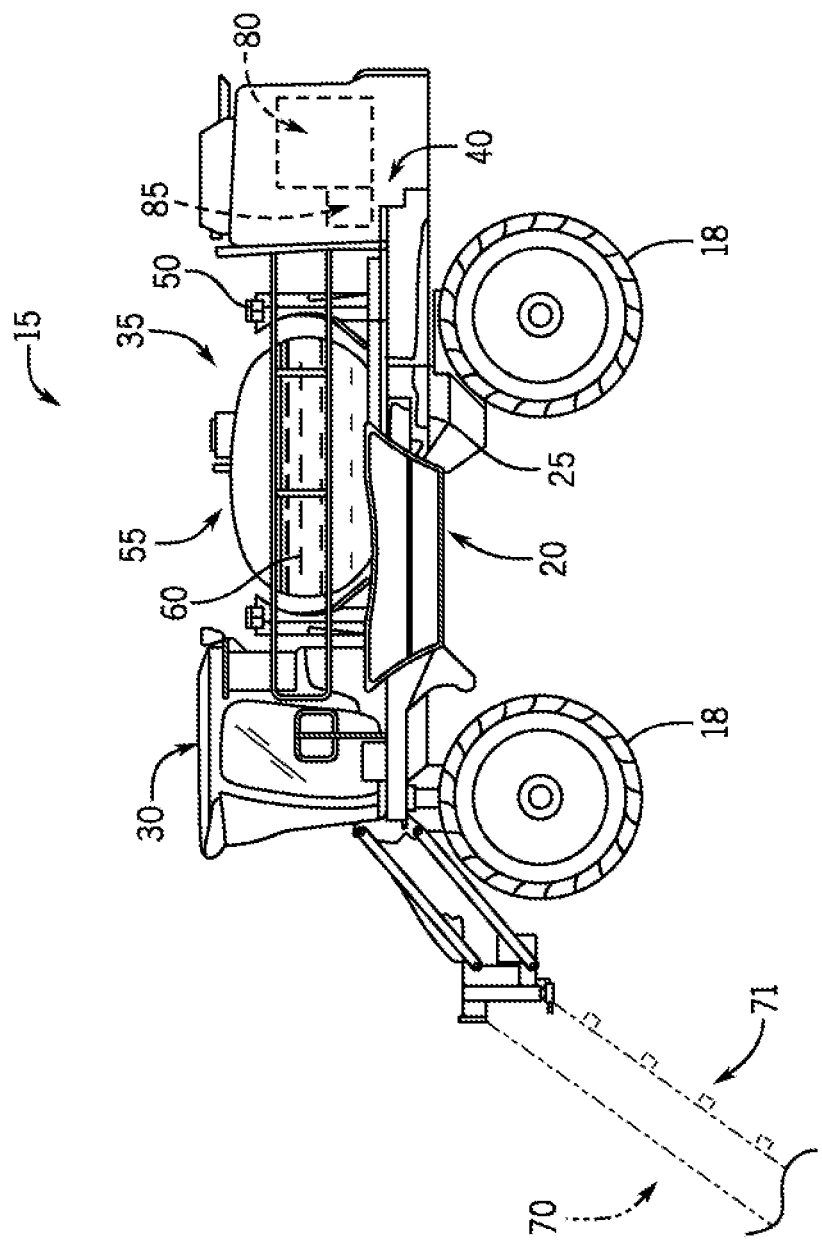
FIG. 1 is a side elevation view of self-propelled off-road agricultural vehicle with a spray system in accordance with an aspect of the invention.

Referring now to the drawings and specifically to FIG. 1, a spray system explained in greater detail elsewhere herein is shown for use with an exemplar self-propelled off-road agricultural vehicle. The self-propelled off-road agricultural vehicle is shown here by way of example as a self-propelled sprayer 15. The sprayer 15 is shown as a front-mounted boom self-propelled sprayer such as those available from CNH Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well as boom-less sprayers, tiered booms, and detachable sprayers.

Still referring to FIG. 1, sprayer 15 includes wheels 18 supporting a chassis 20 having chassis frame 25 that supports various assemblies, systems, and components. These various assemblies, systems, and components include a cab 30, and an application system shown as spray arrangement 35, and a hydrostatic drivetrain system 40. Spray arrangement 35 includes storage containers such as a rinse tank 50 storing water or a rinsing solution and a product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump 36 conveys product 60 from product tank 55 through plumbing components such as interconnected pieces of tubing and through a foldable and height-adjustable boom of a boom system 70 for release out of spray nozzle assemblies 71 that are spaced from each other along the width of the boom during spraying operations of sprayer 15.

Figure 2:
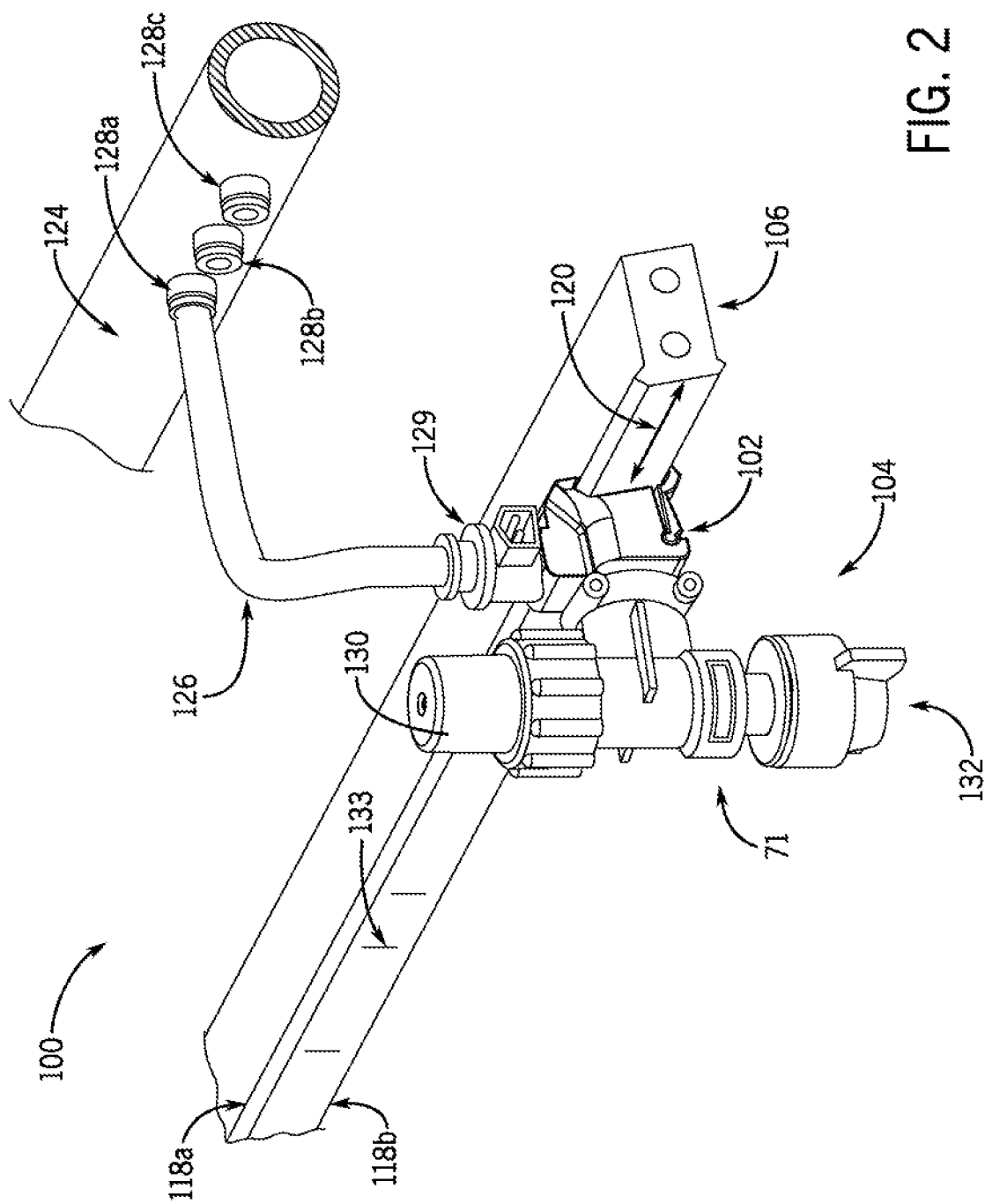
FIG. 2 is an isometric view of a spray system in accordance with an aspect of the invention.

Referring now to FIG. 2, an isometric view of a spray system 100 is provided in accordance with an aspect of the invention. The spray system 100 can include a spray nozzle assembly 71 for spraying the liquid product 60 and an attachment arrangement 102 coupled to the nozzle assembly 71. Accordingly, the attachment arrangement 102 and the nozzle assembly 71 together form a nozzle system 104. The nozzle system 104 can be configured to move along a rail 106 or frame, infinitely through multiple positions, upon unlocking the attachment arrangement 102 with respect to the rail 106. In addition, the nozzle system 104 can be configured to securely mount to a given position of the multiple positions for spraying the liquid product 60 during spray operations upon locking the attachment arrangement 102 with respect to the rail 106. In one aspect, the boom system 70 may be the rail 106. However, in another aspect, the boom system 70 can comprise a separate structure supporting the rail 106.

Figure 3:
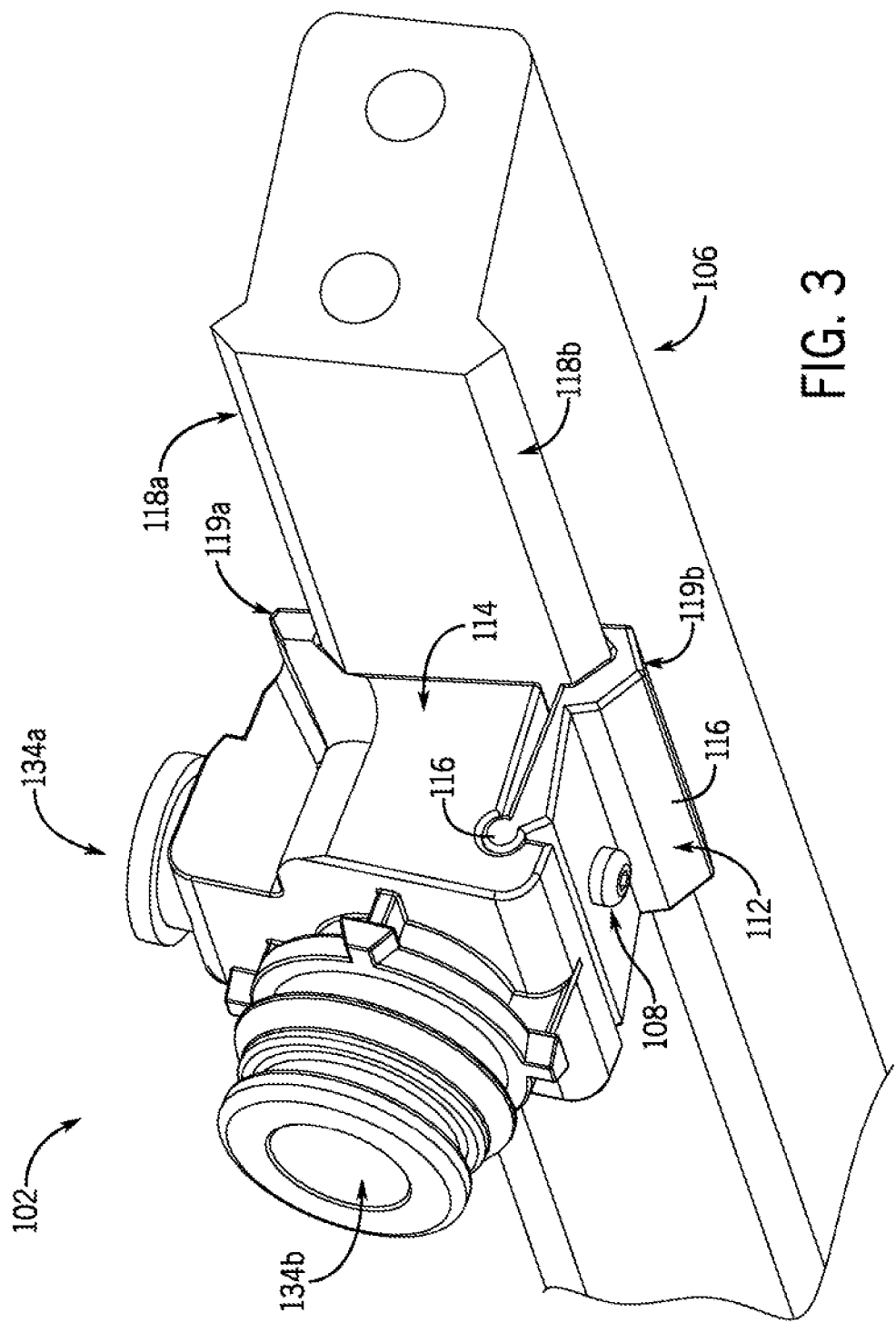
FIG. 3 is an isometric view of an attachment arrangement and rail of the spray system of FIG. 2.

With additional reference to FIGS. 2 and 3, in one aspect, the attachment arrangement 102 can comprise a fastener 108 configured to tighten and loosen the attachment arrangement 102 with respect to the rail 106, thereby providing the locking and unlocking, respectively. The attachment arrangement 102 can further comprise a clip 112 that is movable with respect to a body 114. An integral hinge 116 of the clip can rotatably fit in a socket of the body 114. The fastener 108, which could be a screw, is configured to tighten or loosen an arm 118 of the clip 112 with respect to the body 114 with the rail 106 in between. For example, by tightening the fastener 108, the hinge 116 rotates toward the body 114 to compress the rail 106 in between the arm 118 and the body 114, thereby locking the attachment arrangement 102 with respect to the rail 106. Conversely, by loosening the fastener 108, the hinge 116 rotates away from the body 114 to release the rail 106 in between the arm 118 and the body 114, thereby unlocking the attachment arrangement 102 with respect to the rail 106.

In one aspect, the clip 112 and the body 114 can be configured to attach around opposing upper and lower lips 118a and 118b, respectively, which extending transversely with respect to the rail 106, along a front facing longitudinal direction. This can allow the arm 118 and the body 114 to form inwardly opposing upper and lower hooks 119a and 119b, respectively, for securely retaining the nozzle system 104 to the rail 106 when the clip 112 and the body 114 are compressed with the rail 106 in between. Accordingly, upon unlocking the attachment arrangement 102 with respect to the rail 106, the attachment arrangement 102 can slide laterally along the rail 106, in a direction 120 (see FIG. 2), through multiple positions, while still being retained to the rail 106. Similarly, upon locking the attachment arrangement 102 with respect to the rail 106, the attachment arrangement 102 can be securely mounted to a given position, with any movement with respect to the rail 106 being inhibited.

Referring again to FIG. 2, the spray system 100 can further include a product line 124 coupled to the nozzle system 104. The product line 124 can be configured to supply the liquid product 60 to the nozzle system 104. A branch line 126, which could be a flexible hose, can connect one of multiple ports of the product line 124, such as a first port 128a, to the nozzle system 104. Accordingly, the product line can comprise numerous apertures or ports 128, more than there are spray nozzle assemblies 71, for supplying the liquid product 60. In this example, the first port 128a is coupled to the attachment arrangement 102 by the branch line 126. However, a second port 128b (adjacent to the first port 128a), and a third port 128c (adjacent to the second port 128b), are sealed to inhibit the flow of the liquid product 60.

The nozzle system 104 can receive the liquid product 60 through the attachment arrangement 102, allowing the liquid product 60 to flow from the attachment arrangement 102 to the nozzle assembly 71. An optional flow meter 129 can be configured in the attachment arrangement 102 for measuring liquid product 60 flow through the attachment arrangement 102 to the nozzle assembly 71. An electronically controlled solenoid 130 of the nozzle assembly 71 can operate to open or close an orifice 132 of the nozzle assembly 71, as determined by a control system, for conducting or ceasing spray operations. With reference again to FIGS. 3 and 4, the attachment arrangement 102 can include liquid flow ingress and egress apertures 134a and 134b, respectively, with an internal channel therebetween for enabling such liquid flow. The branch line 126 can connect to the ingress aperture 134a, and the nozzle assembly 71 can connect to the egress aperture 134b, each in any number of ways. For example, as shown, the branch line 126 can connect to the ingress aperture 134a via push to connect in which the branch line is pushed into the aperture and captively retained by barbs in the aperture. Also, as shown, the nozzle assembly 71 can connect to the egress aperture 134b via an O-ring and groove for retaining a wire clip for captively retaining the nozzle assembly 71.

In addition, still referring to FIG. 2, the rail 106 can include multiple marks 133 or other indicia at predetermined locations for identifying various desirable positions for nozzle assemblies 71. The marks 133 can identify standard nozzle spacings for various configurations, including with spacing according to English and/or metric measurements, and in different colors. This can allow rapid configuration of the spray system.

Figure 4:
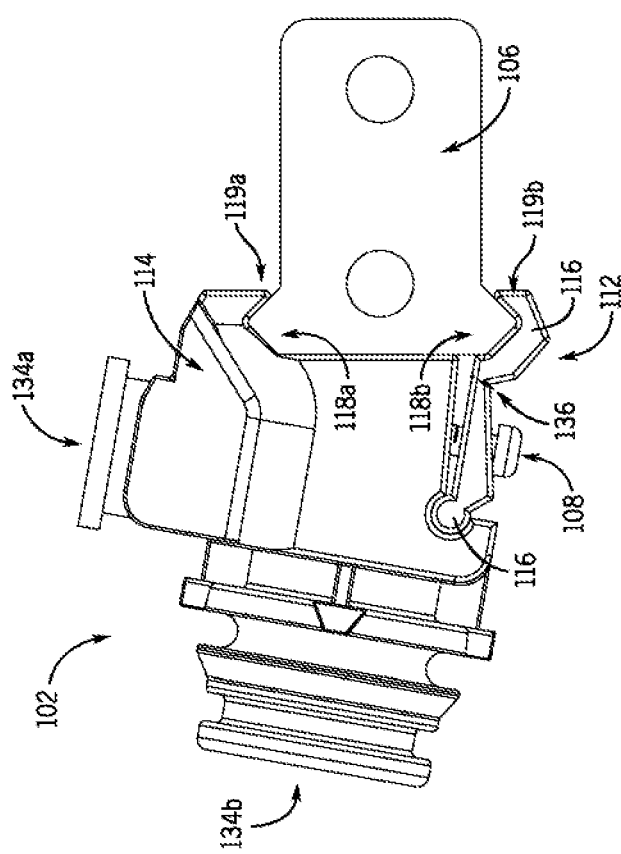
FIG. 4 is a side view of the attachment arrangement and rail of FIG. 3.

Also, referring to FIGS. 2 and 4, the clip 112 can be constructed to break away from the body 114, and the rest of the nozzle system 104, at a dimensionally thinned break point 136 (see FIG. 4). This could occur, for example, if the nozzle system 104 is impacted harshly by another object, such as tree branches. The clip 112 breaking away from the body 114 essentially breaks the lock, thereby allowing the nozzle system 104 to release freely from the rail 106, thereby minimizing damage. The clip 112 can be easily replaced and is affordable. Moreover, the branch line 126 can act as a lanyard to retain the nozzle system 104 to the sprayer 15 if broken off.

Figure 5:
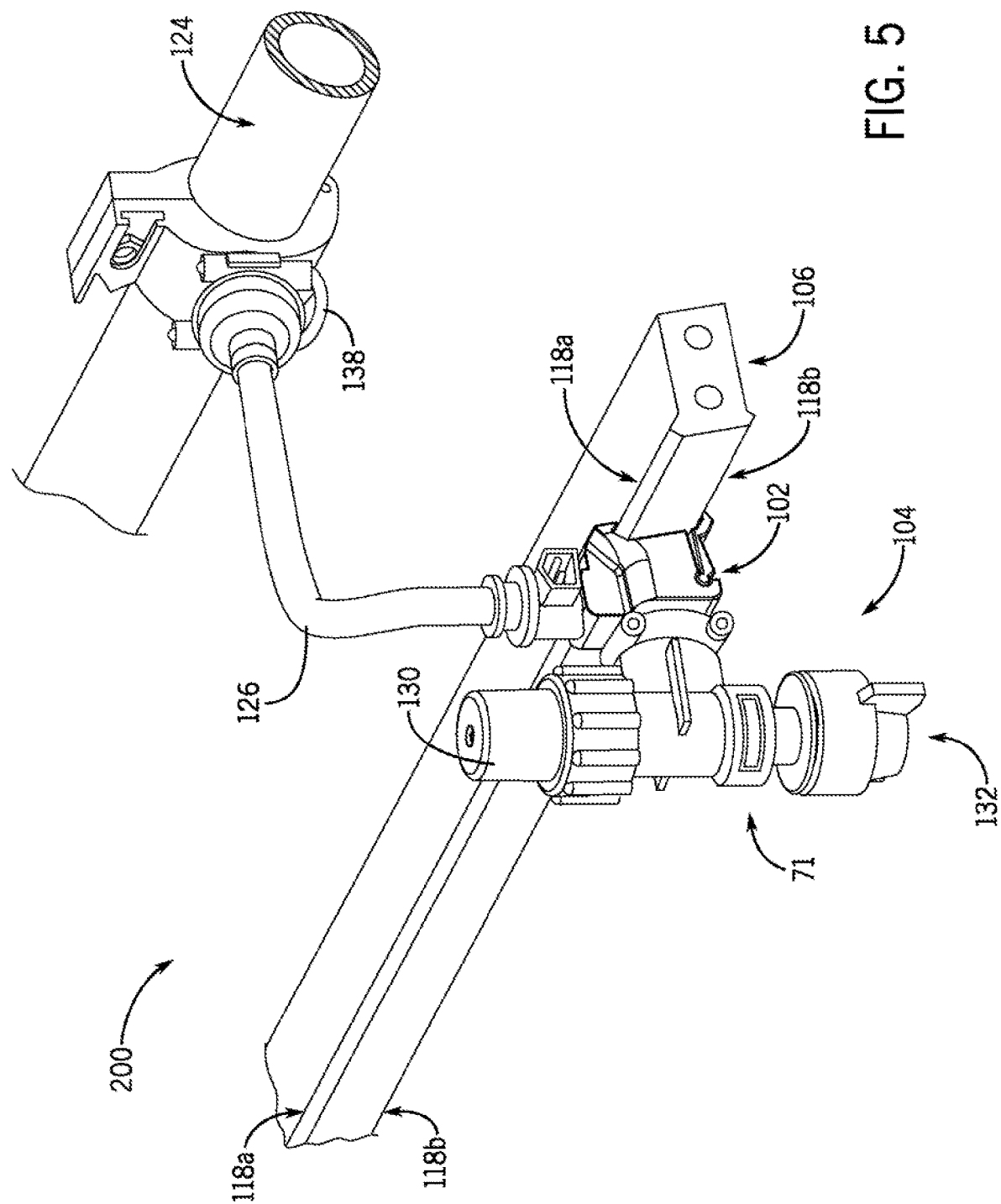
FIG. 5 is an isometric view of an alternative spray system in accordance with another aspect of the invention.

Referring now to FIG. 5, an isometric view of an alternative spray system 200, where like numerals refer to like parts throughout, is provided in accordance with another aspect of the invention. In the alternative spray system 200, the branch line 126 can connect to a port of the product line 124 via an O-ring and groove receiving a wire clip 138 for captively retaining the branch line 126.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray system for an agricultural machine, comprising:
 a nozzle assembly for spraying a liquid product;
 an attachment arrangement coupled to the nozzle assembly, the attachment arrangement and the nozzle assembly together forming a nozzle system, and
 a product line coupled to the nozzle system, the product line being configured to supply the liquid product to the nozzle system,
 wherein the nozzle system is configured to move along a rail through a plurality of positions upon unlocking the attachment arrangement with respect to the rail, and
 wherein the nozzle system is configured to securely mount to a given position of the plurality of positions for spraying a liquid product upon locking the attachment arrangement with respect to the rail;
 wherein the nozzle system is configured to slide laterally along the rail upon unlocking the attachment arrangement;
 wherein the product line comprises a plurality of apertures for supplying the liquid product, wherein a first aperture of the plurality of apertures is coupled to the attachment arrangement by a branch line, and wherein a second aperture of the plurality of apertures is sealed to inhibit the flow of liquid product, the second aperture being adjacent to the first aperture.

2. The spray system of claim 1, wherein the attachment arrangement comprises a fastener configured to tighten or loosen the attachment arrangement with respect to the rail.

3. The spray system of claim 2, wherein the attachment arrangement further comprises a clip movable with respect to a body, wherein the fastener is configured to tighten or loosen the clip with respect to the body.

4. The spray system of claim 3, wherein the clip and the body are configured to attach around opposing lips of the rail.

5. The spray system of claim 1, wherein the nozzle system is configured to slide laterally along the rail upon unlocking the attachment arrangement.

6. The spray system of claim 1, wherein the product line is coupled to the attachment arrangement of the nozzle system by a flexible hose.

7. The spray system of claim 1, wherein the nozzle assembly comprises an orifice and an electronically controlled solenoid for opening and closing the orifice.

8. A self-propelled agricultural vehicle, comprising:
 a chassis supporting a cab and having a plurality of wheels for moving the vehicle;
 a liquid product application system supported by the chassis, the liquid product application system comprising a rail and a plurality of nozzle systems, each nozzle system including:
 a nozzle assembly for spraying a liquid product;
 an attachment arrangement coupled to the nozzle assembly, and
 a product line coupled to each nozzle system, the product line being configured to supply the liquid product to each nozzle system;
 wherein each nozzle system is configured to move along the rail through a plurality of positions upon unlocking the attachment arrangement with respect to the rail, and
 wherein each nozzle system is configured to securely mount to a given position of the plurality of positions for spraying a liquid product upon locking the attachment arrangement with respect to the rail;
 wherein each nozzle system is configured to allow liquid product to flow through the attachment arrangement and the nozzle assembly;
 wherein the product line comprises a plurality of apertures for supplying the liquid product, wherein a first set of apertures of the plurality of apertures are coupled to the attachment arrangements by branch lines, and wherein a second set of apertures of the plurality of apertures are sealed to inhibit the flow of liquid product.

9. The vehicle of claim 8, wherein the attachment arrangement comprises a fastener configured to tighten or loosen the attachment arrangement with respect to the rail.

10. The vehicle of claim 9, wherein the attachment arrangement further comprises a clip movable with respect to a body, wherein the fastener is configured to tighten or loosen the clip with respect to the body.

11. The vehicle of claim 10, wherein the rail comprises opposing lips, and wherein the clip and the body are configured to attach around the opposing lips.

12. The vehicle of claim 8, wherein each nozzle system is configured to slide laterally along the rail upon unlocking the attachment arrangement.

13. The vehicle of claim 8, wherein the product line is coupled to the attachment arrangement of each nozzle system by a flexible hose.

14. The vehicle of claim 8, wherein the rail comprises a plurality of marks identifying the plurality of positions.

* * * * *